US005099977A

United States Patent [19]

Hirose et al.

[11] Patent Number: 5,099,977

[45] Date of Patent: Mar. 31, 1992

[54] CONTROL APPARATUS FOR PEOPLE MOVER SYSTEMS

[75] Inventors: Masayuki Hirose; Hideaki Takahashi; Hisao Chiba, all of Katsuta, Japan

[73] Assignee: Hitachi, Ltd., Tokyo, Japan

[21] Appl. No.: 682,454

[22] Filed: Apr. 9, 1991

[30] Foreign Application Priority Data

Apr. 11, 1990 [JP] Japan .................................. 2-94029

[51] Int. Cl.[5] ............................................ B65G 15/00

[52] U.S. Cl. ..................................... 198/323; 198/330

[58] Field of Search ........................ 198/322, 323, 330

[56] References Cited

U.S. PATENT DOCUMENTS 3,580,376 5/1971 Loshbough ........................ 198/323

FOREIGN PATENT DOCUMENTS 61-203092 9/1986 Japan .

62-41183 2/1987 Japan .

1-122892 5/1989 Japan .

2033862 5/1980 United Kingdom ............... 198/330

*Primary Examiner*—Robert P. Olszewski

*Assistant Examiner*—Cheryl L. Gastineau

*Attorney, Agent, or Firm*—Antonelli, Terry, Stout & Kraus

[57] ABSTRACT

An induction motor, which drives an escalator, can be selectively supplied by both a commercial power source and a power converting unit. A control apparatus for the escalator has a trouble detector for detecting the occurence of a trouble or abnormality on the basis of an input and/or output current and/or voltage of the power unit, an actual speed of the escalator, a speed command for the escalator speed and so on. Usually, the motor is fed by the power converting unit, and the power supply thereto is switched over from the power converting unit to the commercial power source, when the trouble detector produces its output representative of the occurrence of a trouble or abnormality.

16 Claims, 11 Drawing Sheets

CONTROL APPARATUS FOR PEOPLE MOVER SYSTEMS

BACKGROUND OF THE INVENTION

1. Field of the Invention

The present invention relates to a control apparatus for a people mover system, and especially to the control apparatus capable of safely coping with the occurrence of a trouble or abnormality in a power unit for supplying electric power to a driving unit of the people mover system and/or a controlling unit therefor.

2. Description of the Related Art

Conventionally, it was usual to control a people mover system, such as an escalator, a moving sidewalk and so on, at a constant moving speed. With the remarkable progress of a variable speed control technique of motors, however, it has recently been proposed to control the speed of a people mover system so as to follow a desired reference, which is arbitrarily set in accordance with the necessity.

By way of example, it is proposed to change a moving speed of a people mover system by controlling an output power of a power converting unit of the system in response to the request of a caretaker (Japanese Patent Publication JP-A-62/41183 (1987)), or of a user (the same JP-A-1 122892 (1989)), whereby an old or handicapped person can use the people mover system easily, and the energy saving is attainable. Further, in the Japanese Patent Publication JP-A-61/203092 (1986), it is disclosed that an escalator is usually operated by a commercial power source and when a person using a wheelchair is going to step in the escalator, it is operated by a variable speed controller at a reduced speed.

By the way, in a power converting unit composed of a converter and an inverter, it is well known that an unusual state, such as undervoltage, overvoltage and overcurrent, is often caused by a trouble or abnormality in semiconductor elements of the converter and the inverter and that in a control unit therefor. In the case of the undervoltage, an escalator results in stopping or, if its load is incommensurately large, reversing the motion. In the contrary case, i.e., because of the overvoltage or overcurrent, there occurs the danger of making an escalator move at an abnormally high speed.

In those cases, the safest way may be to stop an escalator. If, however, an escalator is stopped, when a person using a wheelchair is on it, it is a lot of trouble to carry him or her outside the escalator together with the wheelchair. Further, since one step of treadboards in an escalator is manufactured to be somewhat higher than that in a usual stairway, an old person encounters the difficulty in getting out of the escalator by his or her own feet. The prior art as mentioned above did not take those problems into consideration at all and therefore could not provide the safe and sufficient service for users.

SUMMARY OF THE INVENTION

An object of the present invention is to provide a control apparatus for a people mover system, by which the service for users is never degraded, even when a trouble or abnormality occurs in a power unit of the people mover system and/or a control unit therefor.

Most generally speaking, a feature of the present invention resides in that the power supply to a driving motor of a people mover system is switched over from a power unit to a commercial power source, when such a trouble or abnormality as the people mover system has to be stopped occurs in a driving control system including a power unit for feeding the motor and/or a control unit therefor.

According to the present invention, since a people mover system can be operated at a desired speed not through a troubled driving control system, but directly by a commercial power source, persons on a people mover system can be safely carried outside the people mover system.

DESCRIPTION OF THE PREFERRED EMBODIMENTS

In the following, embodiments of the present invention will be explained with reference to accompanying drawings.

Figure 1:
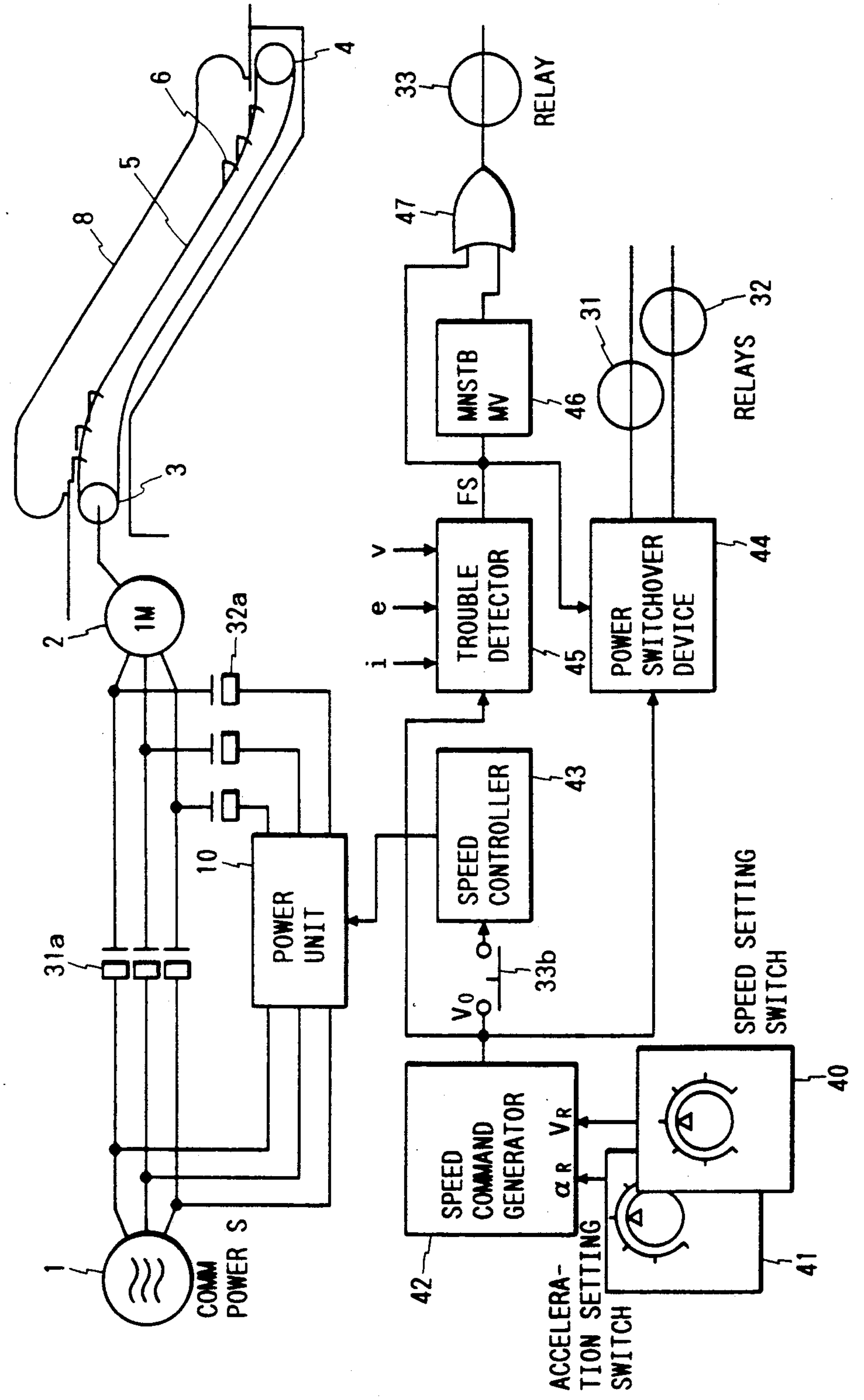
FIG. 1 schematically shows an overall configuration of a control apparatus for an escalator according to an embodiment of the present invention.

FIG. 1 schematically shows the overall configuration of a control apparatus for an escalator according to an embodiment of the present invention. Referring to the figure, reference numeral 1 denotes a commercial power source capable of providing AC electric power of constant voltage and constant frequency. Reference numeral 2 denotes an AC motor, which drives step chain driving sprocket 3, whereby step chain 5 provided between the driving sprocket 3 and driven sprocket 4 is moved. Plural treadboards 6 continuously linked in the endless form are coupled to the step chain 5, so that they are moved as the movement of the step chain 5. Reference numeral 8 denotes a handrail, which is moved in synchronism with the movement of the treadboards 6.

The commercial power source 1 supplies the AC electric power of the constant voltage and the constant frequency to power unit 10, as well as to the motor 2 through normally open contacts 31*a*, which are actuated by relay 31 described later. The power unit 10 converts the AC power supplied by the commercial power source 1 into AC power of predetermined voltage and frequency, and supplies the converted AC power to the motor 2 through normally open contacts 32*a*, which are actuated by relay 32 described later. Thereby, the treadboards 6 can be driven to move at a desired moving speed.

Figure 1A:
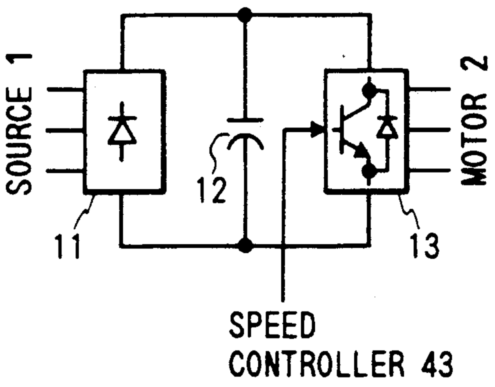
FIGS. 1*a* and 1*b* are drawings showing examples of a power unit used in the embodiment of FIG. 1.
Figure 1B:
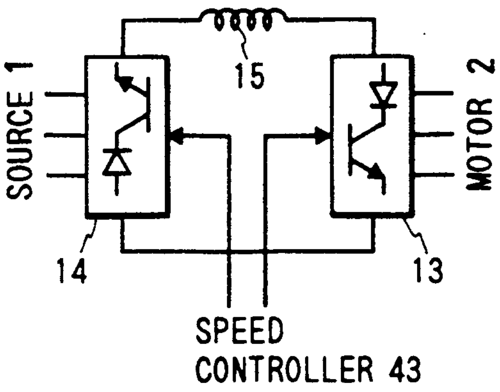

As is well known, the power unit 10 is composed of a converter or rectifier for converting AC power to DC power and an inverter inverting the converted DC power into AC power. It is also known that such a power converting unit has two types, i.e., a voltage source type and a current source type, as shown in FIGS. 1*a* and 1*b*, respectively. As shown in FIG. 1*a*, a voltage source type power unit comprises rectifier or converter 11 for producing DC power of constant or variable voltage, capacitor 12 for smoothing the voltage of the converted DC power and inverter 13 for inverting the DC power into AC power of controlled voltage and/or frequency. On the other hand, a current source type power unit comprises converter 14 capable of producing DC power of constant current and controlled voltage, reactor 15 for smoothing the current of the DC power and inverter 13 for inverting the DC power into AC power of controlled voltage and/or frequency. Both types of the power converting unit can of course be used in the present invention.

Next, the description will be made of a control unit of the embodiment shown in FIG. 1. Although FIG. 1 shows the control unit in the form of discrete hard ware, it is of course that part or the whole of the functions of this control unit can be substituted by a microcomputer which is so programmed as to achieve the functions as described below.

The power unit 10 controls its output power in response to a control signal generated by speed controller 43. When a user or caretaker adjusts speed setting switch 40 and/or acceleration setting switch 41, a desired speed reference $V_R$ and/or an desired acceleration reference $\alpha_R$ are given to speed command generator 42, which generates a speed command $V_O$ on the basis thereof. The thus obtained speed command $V_O$ is applied to the speed controller 43 through normally closed contact 33*b*, which is actuated by relay 33 described later. The speed controller 43 generates the control signal to the power unit 10 in accordance with the speed command $V_O$, whereby the voltage and/or the frequency of the output power of the power unit 10 is controlled in dependence on the speed command $V_O$ and the motor 2 can be controlled to rotate at a desired speed.

In FIG. 1, although the speed setting switch 40 and the acceleration setting switch 41 are shown as a rotary dial type, those setting switches can be substituted by switches of a push button type, which can select one of reference for the high, medium and low speed, when one of the push button switches is manipulated. These reference setting switches 40, 41 can be provided in a machine room or a monitoring room, if only a caretaker is allowed to manipulate them, or in the neighbor of an entrance and an exit of an escalator, if users are also allowed to manipulate them. Further, it is also possible that there are provided user sensors in the neighbor of an entrance and an exit of an escalator to count a number of persons on the escalator, and the speed and acceleration references are determined on the basis of the detected amount of the persons on the escalator.

Figure 2:
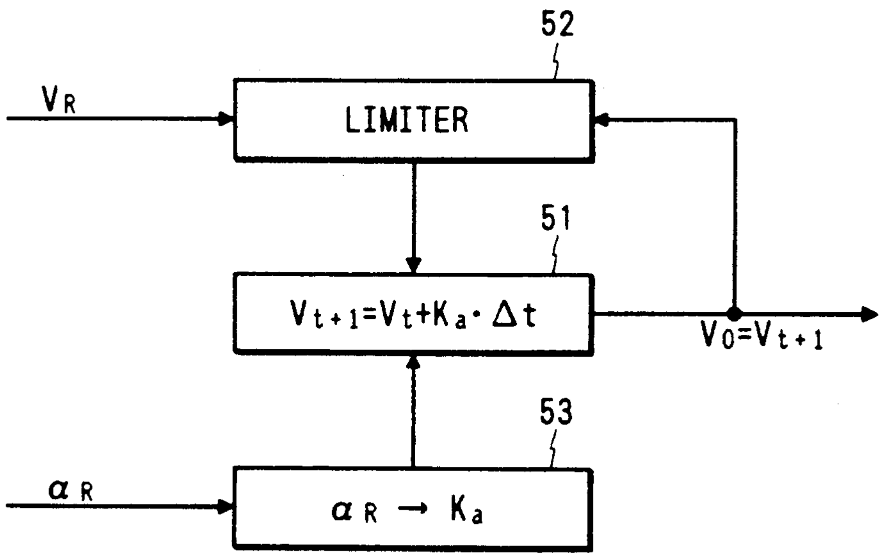
FIG. 2 is a functional block diagram of a speed command generator used in the embodiment of FIG. 1.

Referring now to FIGS. 2, the speed command generator 42 will be described more in detail. The figure is a block diagram showing the function of the speed command generator 42. This speed command generator 42 comprises speed command calculator 51, limiter 52 and acceleration-to-integration gain converter 53 to determine the speed command $V_O$ on the basis of the speed reference $V_R$ and the acceleration reference $\alpha_R$.

The acceleration reference $\alpha_R$ given by the acceleration setting switch 41 in proportion to a required acceleration is at first converted to the integration gain $K_a$ by the converter 53 and the calculator 51 carries out the addition of the gain $K_a$ to a previous calculation result $V_t$ for every predetermined period $\Delta t$ to obtain a new calculation result $V_{t+1}$. The limiter 51 makes the operation of the calculator 51 stop, when the thus obtained speed command $V_O$ becomes equal to the speed reference $V_R$ set by the speed setting switch 40.

Figure 3:
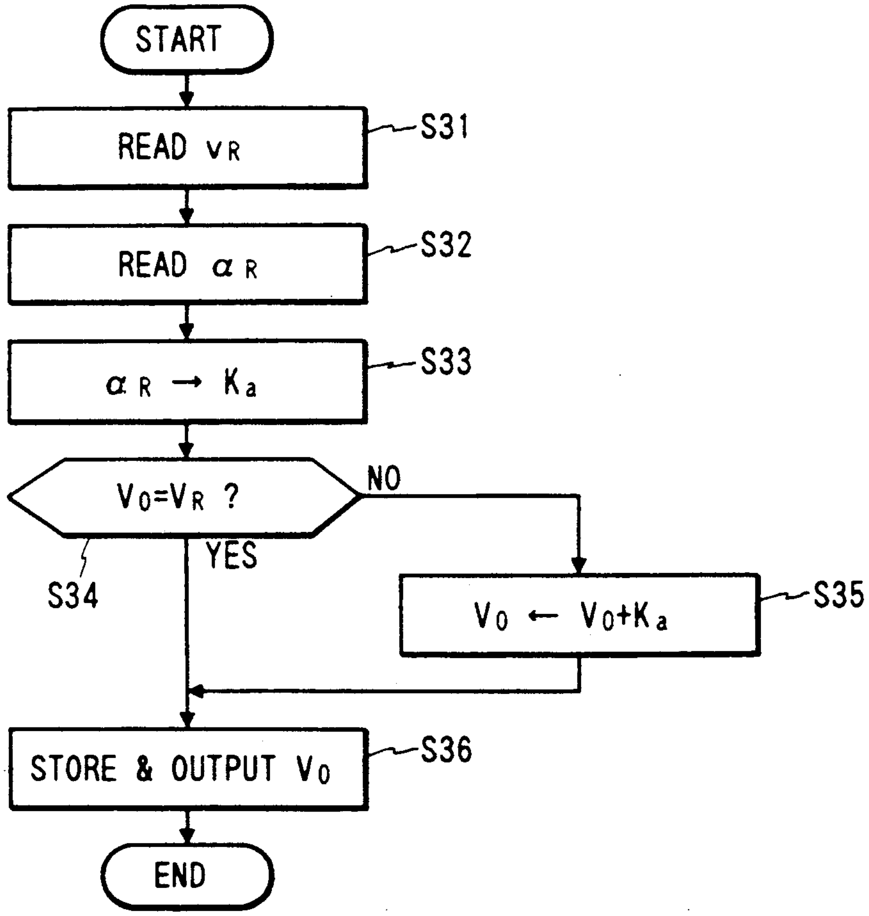
FIG. 3 is a flow chart of the processing to be executed by a microcomputer to achieve the function of the speed command generator.

If the same function as mentioned above is achieved by a microcomputer, it should be programmed so as to execute the processing operation as shown by the flow chart of FIG. 3. This processing operation is repeatedly executed for every predetermined period $\Delta t$. As shown in the flow chart, after start, the speed reference $V_R$ and the acceleration reference $\alpha_R$ are read at steps S31 and S32, respectively. The acceleration reference $\alpha_R$ is converted to the integration gain $K_a$ at step S33. Then, it is discriminated at step S34 whether or not the previously calculated $V_O$ is equal to the speed reference $V_R$.

If $V_O$ is not equal to $V_R$, the new $V_O$ is obtained by adding the integration gain $K_a$ to the present $V_O$ at step S35, and thereafter the new $V_O$ is stored in an appropriate area of a memory and output at step S36. If $V_O$ is judged to be equal to $V_R$ at step S34, the operation goes to step S36 without executing step S35. After $V_O$ is output, this operation ends.

The output $V_O$ is given to the speed controller 43 through the normally closed contact 33*b*, in which the control signal to the power unit 10 is generated on the basis of $V_O$. Since there have already been known many kinds of devices for generating a control signal for a power unit, i.e., gate signals for semiconductor elements of a converter and/or an inverter of the power unit, further description thereof will be omitted here.

Referring again to FIG. 1, the control unit further includes trouble detector 45, which detects the occurrence of a trouble or abnormality in the whole driving control system for an escalator, including the power unit 10. To this end, the trouble detector 45 inputs signals corresponding to an input or output current of the converter 11, 14 (FIGS. 1*a* and 1*b*), those of the inverter 13 (the same figures), an output voltage of the converter 11 (i.e., a voltage across the capacitor 12) and a speed of the motor 2 or the sprockets 3, 4. In the figure, the input and output currents of both the converter and the inverter are indicated in common by the reference symbol i. The output voltage of the converter is indicated by the reference symbol e and the speed of the motor 2 and the related parts by the reference symbol v. Further, the trouble detector 45 inputs the speed command $V_O$ to detect a trouble or abnormality in the speed command generator 42. Those input signals are compared with references prepared in advance for the respective input signals, whereby a trouble or abnormality is detected on the basis of the result of the respective comparison.

Referring next to the flow chart of FIG. 4, the operation of the trouble detector 45 will be explained in detail. At step S41 just after start, an actual speed v is read, and then it is discriminated at step S42 whether or not v is larger than $v_L$, which is given in advance and corresponds to a speed, which the actual speed is not allowed to exceed in any case. If v is larger than $v_L$, it is judged that a trouble or abnormality occurs, and the signal FS is made "1" at step S43. Otherwise, the operation goes to step S44, at which the speed command $V_O$ is read.

Then, it is discriminated at step S45 whether or not the speed command $V_O$ is larger than $V_{OL}$, which is also given is advance and corresponds to a speed command, which it is not allowed to exceed in any case. If $V_O$ is larger than $V_{OL}$, it is judged that a trouble or abnormality occurs, and the signal FS is made "1" at step S43. Otherwise, the operation goes to step S46, at which it is discriminated whether or not the difference between v and $V_O$ is larger than a predetermined value $\Delta v$. If the difference exceeds $\Delta v$, it is judged that a trouble or abnormality occurs, and the signal FS is made "1" at step 43. Otherwise, the operation goes to step S47.

At step S47, the output voltage e of the inverter 11 is read, and at steps S48 and S49, it is discriminated whether or not the voltage e is between its upper limit $e_{UL}$ and its lower limit $e_{LL}$. These limits are given on the basis of an overvoltage and an undervoltage, which are determined in advance. If the answers of two steps S48 and S49 are both YES, i.e., the output voltage e is outside these limits, the signal FS is made "1" at step S43.

If the answers of those steps S48 and S49 are both NO, the operation goes to step S50, at which the input and/or output current i of the converter 11, 14 or the inverter 13 is read. At step S51, it is discriminated whether or not the current i is larger than a predetermined limit $i_L$, which is determined on the basis of an overcurrent. If i is larger than $i_L$, it is judged that a trouble or abnormality occurs, and the signal FS is made "1" at step S43. Otherwise, the signal FS is made "0" at step S52.

In the foregoing, a trouble or abnormality in the speed command generator 42 and the speed controller 43 was detected on the basis of the result caused thereby, i.e., the appearance of the unusual speed (step S42), the unusual speed command (step S45), the overspeed (step S46), the overvoltage (step S48), the undervoltage (step S49) and the overcurrent (step S51). However, it is also possible to directly detect a trouble or abnormality itself occurring in the speed command generator 42 and the speed controller 43. Namely, if the speed command generator 42 and the speed controller 43 are formed, together with other devices described later, if necessary, by a microcomputer appropriately programmed so as to perform the necessary functions, a trouble or abnormality in the speed command generation and the speed control, as well as the functions to be achieved, can be detected by an output of a so-called watch dog timer usually provided in the microcomputer, and the signal FS is changed form "0" to "1" by the output of the watch dog timer.

Further, in the case where two sets of the speed command generator 42 and the speed controller 43 are provided as a dual system, a trouble or abnormality in the system can be detected, when the comparison of two outputs of the respective sets shows that they are different from each other. In the dual system as mentioned above, other devices can be further included.

Furthermore, a trouble or abnormality in the control unit is also detected by watching a control signal produced by the speed controller 43. Generally, the control signal to the power unit 10 regularly changes between the high and low levels at a certain period determined by the frequency of the switching operation of the power unit 10. If, therefore, it is detected by a timer that the same level, i.e., the high level or the low level, of the control signal continues over a predetermined period, it is judged that a trouble or abnormality occurs, and the signal FS can be made "1".

In this manner, if a trouble or abnormality of the control unit can be directly detected, it can be detected in a shorter time, compared with the case where it is indirectly detected from a driving mechanism including the motor 2 and the sprockets 3, 4, or the input or output of the power unit 10.

Since the trouble detector 45, which is producing its output signal FS of "1" upon the detection of a trouble or abnormality, changes the signal FS from "1" to "0", when the trouble or abnormality disappears, it can be said that the trouble detector 45 also detects the recovery of a trouble or abnormality. This will become further clear in the later explanation.

Returning to FIG. 1, the control unit further includes power switchover device 44, which actuates either one of the relays 31 and 32 to carry out the switchover of power supply to the motor 2 from the power unit 2 to the commercial power source 1 and vice versa, in response to the speed command $V_O$ from the speed command generator 42 and the signal FS from the trouble detector 45. Namely, if the relay 31 is excited and the relay 32 is de-energized, the contacts 31*a* are closed and the contacts 32*a* are opened so that the motor 2 is fed by the commercial power source 1. On the contrary, if the relay 31 is de-energized to open the contacts 31*a* and the relay 32 is excited to close the contacts 32*a*, the motor 2 is separated from the commercial power source 1 and coupled to the power unit 10. Further, as will be apparent later, the power switchover device 44 includes means for preventing both the relays 31 and 32 form being excited simultaneously.

Figure 5:
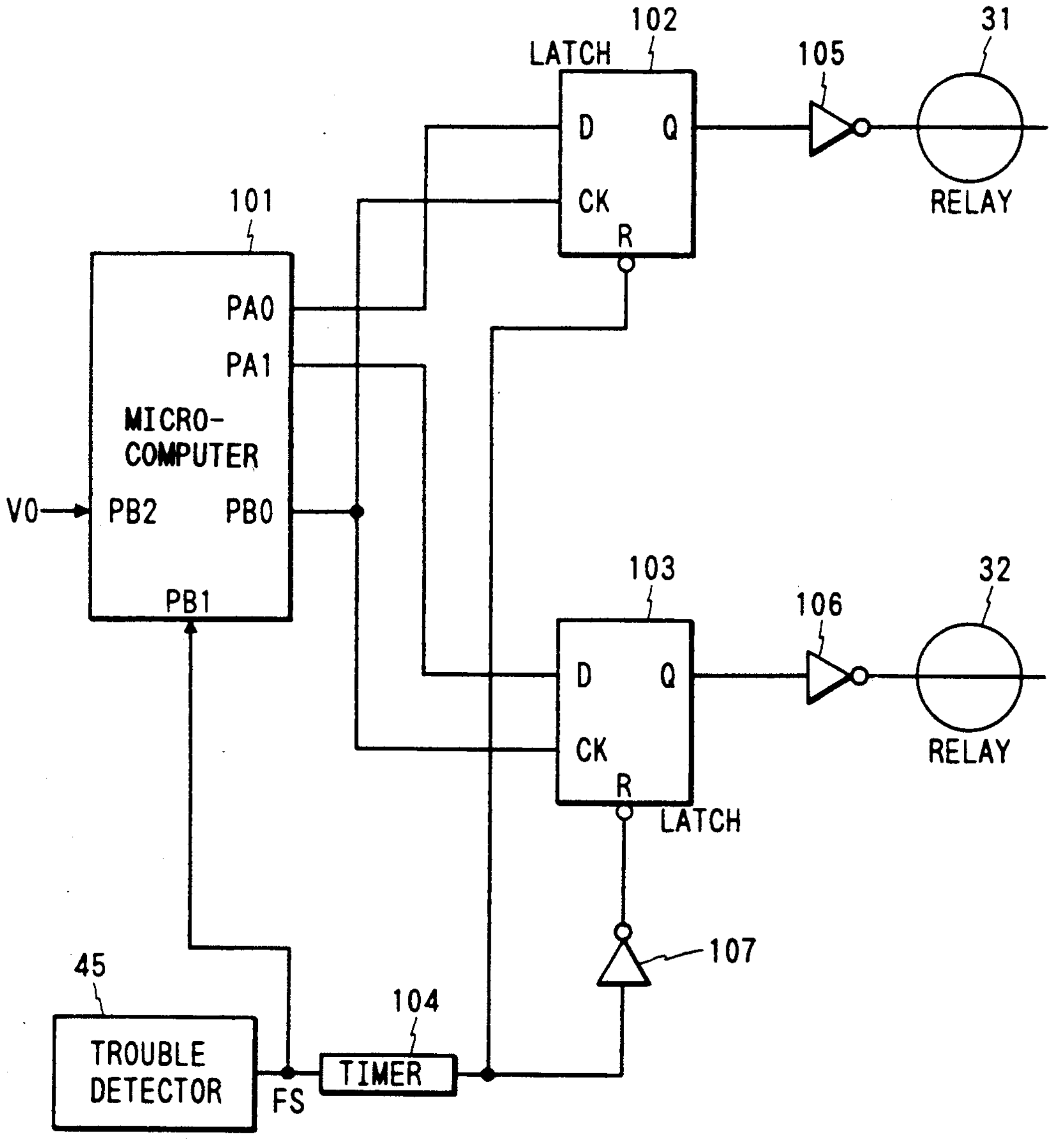
FIG. 5 is a block diagram showing a configuration of a power switchover device used in the embodiment of FIG. 1.

FIG. 5 is a block diagram showing the detailed arrangement of the power switchover device 44. As shown in the figure, the power switchover device 44 comprises microcomputer 101, latches 102, 103, timer 104 and three inverting gates 105, 106, 107. Remaining reference numerals denote the same as parts denoted by the same reference numerals in FIG. 1.

The microcomputer 101 receives the signal FS from the trouble detector 45 at terminal PB1 and executes a predetermined processing to output signals at terminals PA0 and PA1 which change their states between "0" and "1" in response to the signal FS applied to the terminal PB1. The processing operation of the microcomputer 101 will be explained later, with reference to FIGS. 6 and 7. The microcomputer 101 also outputs a signal from terminal PB0, which changes its state from "0" to "1" and again to "0". The signal at the terminal PB0 is produced in synchronism with an internal clock signal of the microcomputer 101, whereby the succeeding operations of various parts are synchronized with each other.

Although the microcomputer 101 further receives the speed command $V_O$ at terminal PB2, this will be referred to later. Further, the signals applied to or derived from the aforesaid terminals will be referred to by the same as the references of the terminals in the following.

The signals PA0 and PA1 are applied to terminal D of the latches 102 and 103, respectively, which latch therein those signals to make their output signal Q "1", when the signal PB0 applied to terminal CK thereof assumes "1". A signal from the timer 104 is applied to terminal R of the latch 102 directly and to that of the latch 103 through the inverting gate 107. The latches 102 and 103 are forced to be reset to make their output Q "0", when the signal is applied to the respective terminals R.

The outputs Q of the latches 102 and 103 are applied to the relays 31 and 32 through the inverting gates 105 and 106, respectively. The relays 31 and 32 are designed to be excited, when the inverting gates 105 and 106 produce their outputs "0", respectively. Therefore, the relays 31 and 32 are excited, when the outputs Q of the latches 102 and 103 assume "1", respectively.

The timer 104 measures a time elapsing from a time when the signal FS becomes "1" and produces an output changing from "0" to "1", when the measured time exceeds a predetermined time $T_t$. If the output of the timer 104 changes from "0" to "1", the reset signal of the latch 102 is removed, and the latch 102 is in the condition of being set in response to the signals applied to the terminals D and CK, because the terminal R thereof is an inversive terminal. On the contrary, the reset signal is applied to the latch 103, which is forced to be reset, because the output "1" of the timer 104 is inverted two times by the inverting gate 107 and its own inversive terminal R.

Figure 6:
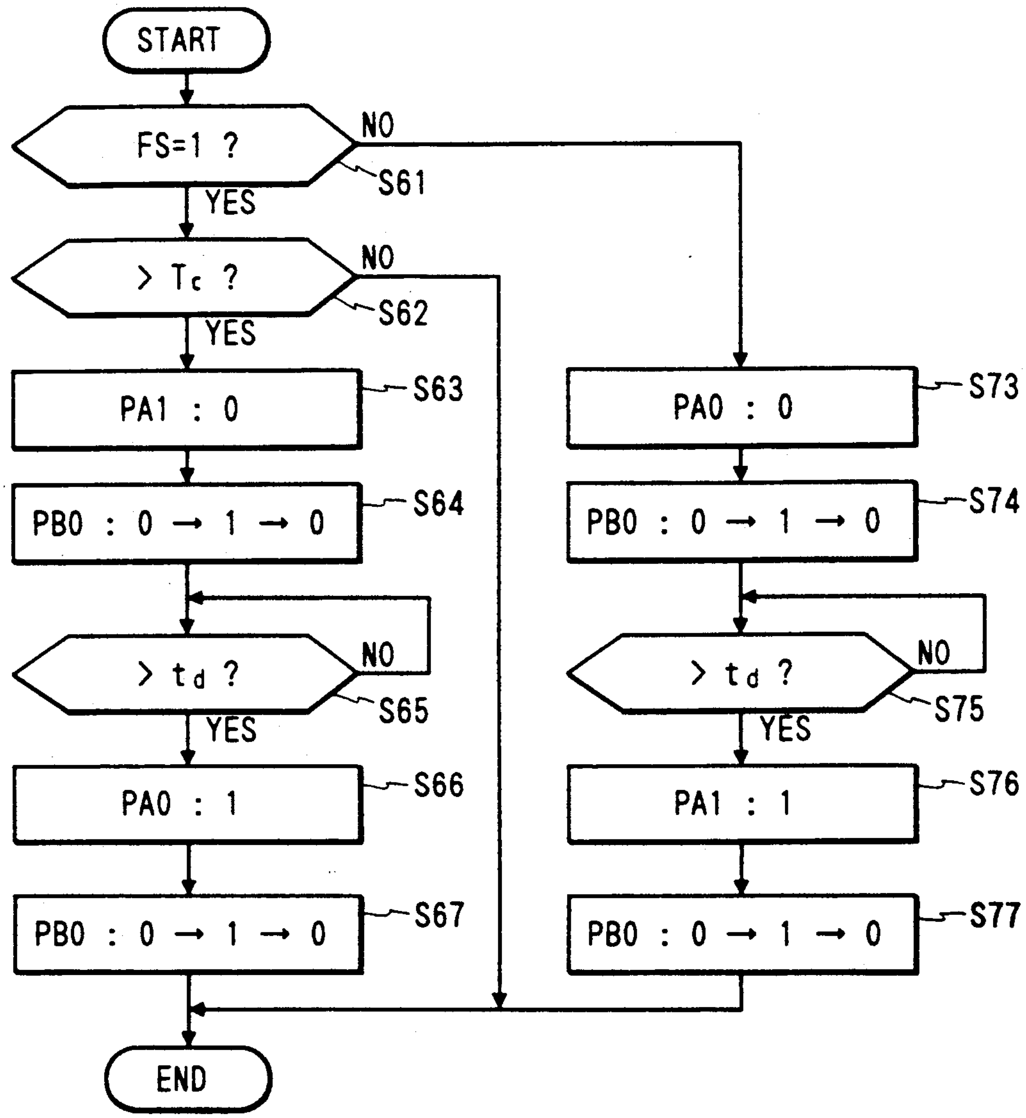
FIG. 6 is a flow chart of the processing to be executed by a microcomputer of the power switchover device.

Referring next to FIGS. 6 and 7, the operation of the power switchover device of FIG. 5 will be explained further in detail.

After start, it is discriminated at step S61 whether or not the signal FS from the trouble detector is "1". If a trouble or abnormality occurs, the answer of this discrimination is YES, and the operation goes to step S62. Otherwise, the answer is NO, and the operation goes to step S73. The case of the occurrence of a trouble or abnormality will be at first explained.

At step S62, it is discriminated whether or not the duration of FS=1 exceeds a predetermined time Tc, which is set in the program excuted by the microcomputer 101. If the answer of this discrimination is NO, it is judged that the signal FS appears by the malfunction of th trouble detector 45, or that the detected trouble or abnormality is not so serious that the power supply to the motor 2 must be switched over from the power unit 10 to the commecial power source 1, and the operation ends.

If the duration of FS=1 exceeds Tc, the operation goes to step S63, at which the equal PA1 is made "0". Then, at step S64, the signal PB0 is changed as "0" - "1" - "0", whereby the signal PA1 of "0" is latched in the latch 103. After that, a predetermined delay time $t_d$ is measured at step S65. When the time $t_d$ elapses, the signal PA0 is made "1" at step S66, and similarly to the above, this signal PA0 of "1" is latched in the latch 102 by changing the signal PB0 as "0" - "1" - "0" at step S67. Thereafter, the operation ends.

Since, as mentioned above, the latches 102 and 103 hold "1" and "0", respectively, the relay 31 is excited and the relay 32 is de-energized. As a result, the contacts 31*a* are closed and the contacts 32*a* are opened, whereby the power supply to the motcr 2 is switched over from the power unit 10 to the commercial power source 1. At this time, there is provided a time difference between the time point when the latch 102 becomes "1" and the time point when the latch 103 becomes "0", because of the time delay $t_d$ mentioned above. Therefore, the contacts 31*a* and 32*a* are never closed simultaneously.

Returning to step S61, there will next be explained the case where the signal FS is not "1". This case also corresponds to such a case as the signal FS of the trouble detector 45 disappears due to the recovery of a trouble or abnormality.

If it is judged at step S61 that the signal FS is not "0", the operation goes to step S73, at which the signal PA0 is made "0". Further, if it is not preferred that the power supply to the motor 2 is switched over just after the recovery of a trouble or abnormality, there can be inserted a discrimination step between step S61 and S73, at which it is discriminated whether or not a predetermined time elapses. If the answer of that discrimination step is YES, the operation goes to step S73, and otherwise the operation ends.

After the signal PA0 is made "0" at step S73, the signal PB0 is changed as "0" - "1" - "0" at step S74, whereby the signal PA0 of "0" is latched in the latch 102. After that, the predetermined delay time $t_d$ is measured at step S75. When the time $t_d$ elapses, the signal PA1 is made "1" at step S76, which is latched in the latch 103 by changing the signal PB0 as "0" - "1" - "0" at step S77. Thereafter, the operation ends.

Since, as mentioned above, the latches 102 and 103 hold "0" and "1", respectively, the relay 31 is de-energized and the relay 32 is excited. As a result, the contacts 31*a* are opened and the contacts 32*a* are closed, whereby the power supply is returned from the commercial power source 1 to the power unit 10. Also at this time, there is provided the time difference between the time point when the latch 102 becomes "0" and the time point when the latch 103 becomes "1", because of the time delay $t_d$ mentioned above. Therefore, the contacts 31*a* and 32*a* are never closed simultaneously.

FIGS. *7a* to *7k* show the time-sequential change of the signals and the operational state of various parts of the power switchover device 44. Further, those figures show two cases of a momentary trouble and a continuous trouble.

At first, the case of a momentary trouble will be explained. Assuming that a momentary trouble occurs at time $t_0$, the trouble detector 45 produces the signal FS for a predetermined time (cf. FIG. *7a*). If the duration of FS=1 is shorter than $T_t$, the timer 104 does not generate any output (cf. FIG. *7b*). Therefore, the microcomputer 101 does not change the state of the signals PA0 and PA1, either (cf. FIGS. *7c* ard *7d*), so that the outputs of the latches 102, 103 do not change their state (cf. FIGS. *7e* and *7g*). In order to make this sure, the timer period $T_c$ set in the microcomputer 101 is usually made somewhat longer than $T_t$ of the timer 104. For example, Tt is set about two seconds. As a result, the relay 31 continues to be de-energized and the relay 32 continues to be excited (cf. FIGS. *7f* and *7h*). In this manner, the power unit 10 continues to feed the motor 2 without being switched over to the commercial power source 1 even in the occurrence of a trouble or abnormality, if it is such a trouble or abnormality as the duration of FS =1 is shorter than $T_t$.

Figures 7A, 7B, 7C, 7D, 7E, 7F, 7G, 7H, 7I, 7J, 7K:
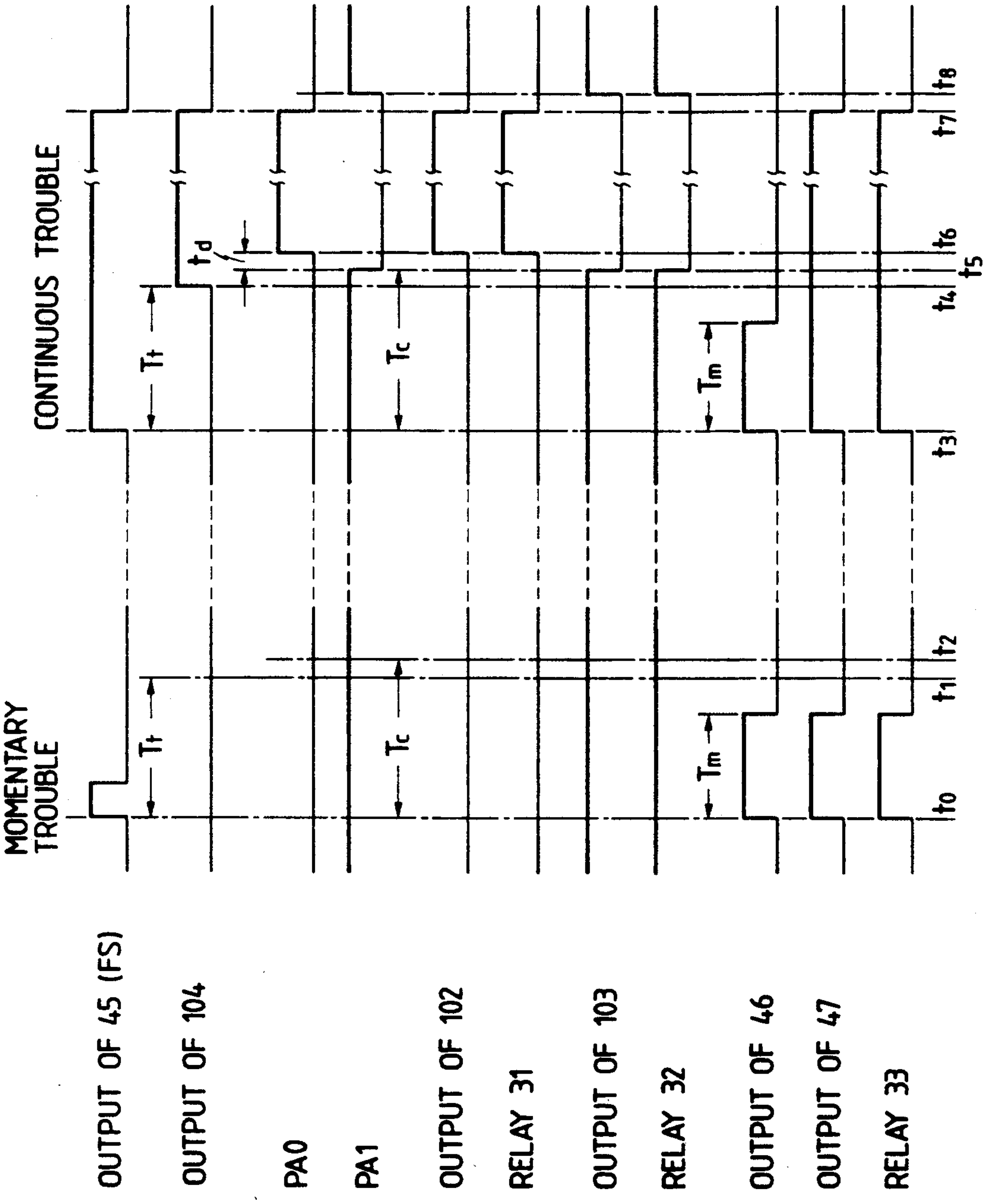
FIGS. 7*a*–7*k* is a time sequence chart for explaining the operation of the power switchover device.

Once, however, the signal FS becomes "1", the monostable multivibrator 46 produces the output for its time constant Tm (cf. FIG. 7i). The time constant Thd m of the monostable multivibrator 46 is set about several hundred milliseconds to one second. Although the signal FS disappears after a short time, the OR gate 47 continues to produce the output due to the output of the monostable multivibrator 46 (cf. FIG. *7j*). As a result, as shown in FIG. *7k*, the relay 33 is excited to open its normally closed contact 33*b*, whereby the application of the speed command $V_O$ to the speed controller 43 is interrupted.

Next, the description will be made of the case of such a continuous trouble as the signal FS=1 is longer than $T_c$. Assuming that the signal FS occurs at time point $t_3$, the timer 104 produces the output at $t_4$ after $T_t$ from $t_3$, and continues to produce it, as long as the signal FS exists (cf. FIGS. 7*a* and 7*b*). At time point $t_5$ after $T_c$ from $t_3$, the microcomputer 101 changes the signal PA1 from "1" to "0" (cf. FIG. 7*d*), and at time point $t_6$, which is further delayed by $t_d$ from $t_5$, the microcomputer 101 changes the signal PA0 from "0" to "1" (cf. FIG. 7*c*).

With the state change of the signals PA0 and PA1 as mentioned above, the relays 31 and 32 operate as shown in FIGS. 7*f* and 7*h*, respectively, whereby the power supply to the motor 2 is switched over from the power unit 10 to the commercial power source 1. The relays 31 and 32 are never closed simultaneously due to the delay time $t_d$ and the difference between $T_t$ and $T_c$.

Further, in this case, although the output of the monostable multivibrator 46 disappears after its time constant Tm, the relay 33 continues to be excited by the signal FS (cf. FIGS. 7*i* to 7*k*). Therefore, the application of the speed command $V_O$ to the speed controller 43 is interrupted for that period. The time constant Tm of the monostable multivibrator 46 is set so as to be shorter than both $T_t$ and $T_c$, so that the control signal to the power unit 10 always disappears before the contacts 32*a* are opened.

If the trouble or abnormality is recovered at time point $t_7$, the signal FS disappears, and the output of the timer 104 disappears, too (cf. FIGS. 7*a* and 7*b*). Simultaneously, the microcomputer 101 changes the state of the signal PA0 from "1" to "0" (cf. FIG. 7*c*), and that of the signal PA1 from "0" to "1" at time point $t_8$ after $t_d$ from $t_7$ (cf. FIG. 7*d*). As a result, the relay 31 is de-energized simultaneously therewith, and the relay 32 is excited with the delay of $t_d$ theraafter (cf. FIGS. 7*f* and 7*h*), whereby the power supply to the motor 2 is returned form the commercial power source 1 to the power unit 10. Also at this time, both the relays 31 and 32 are never closed simultaneously due to the delay time $t_d$.

Figure 8:
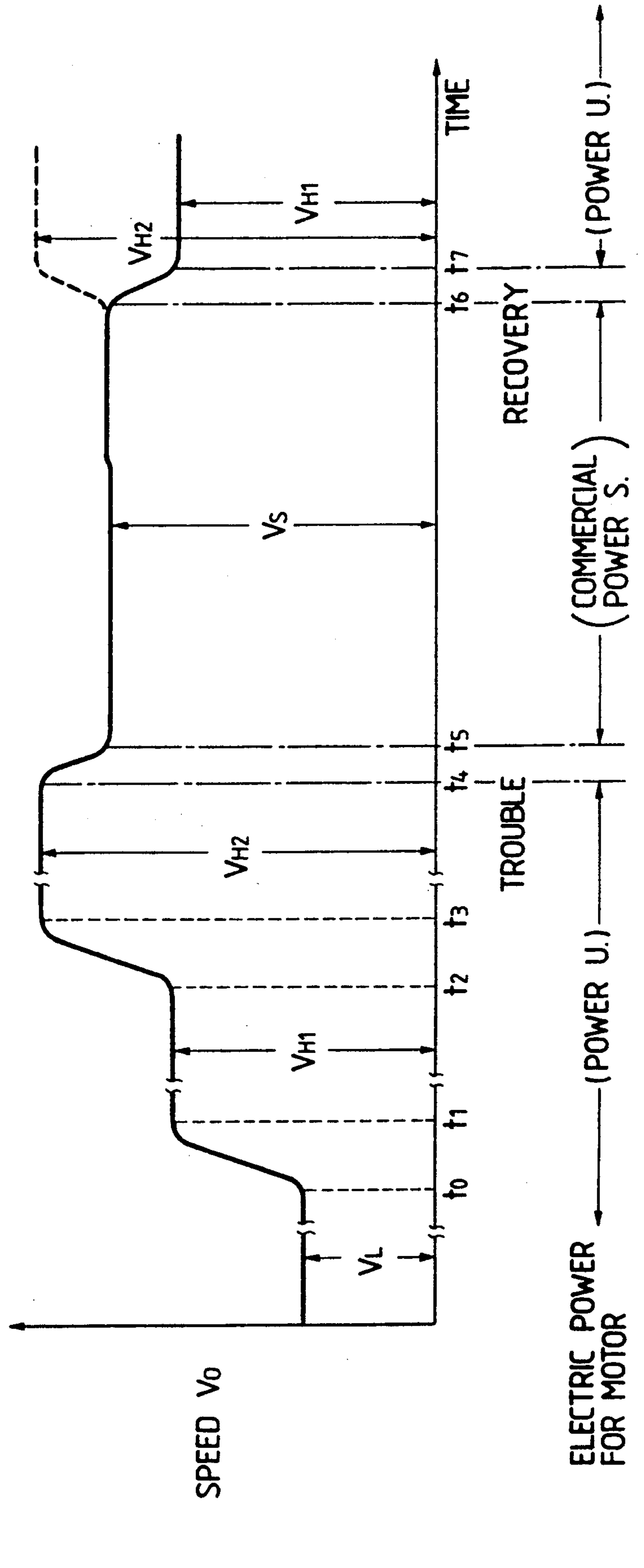
FIGS. 8 to 10 are drawings showing examples of the change of a speed command to explain the operation of the control apparatus according to the present invention.
Figure 9:
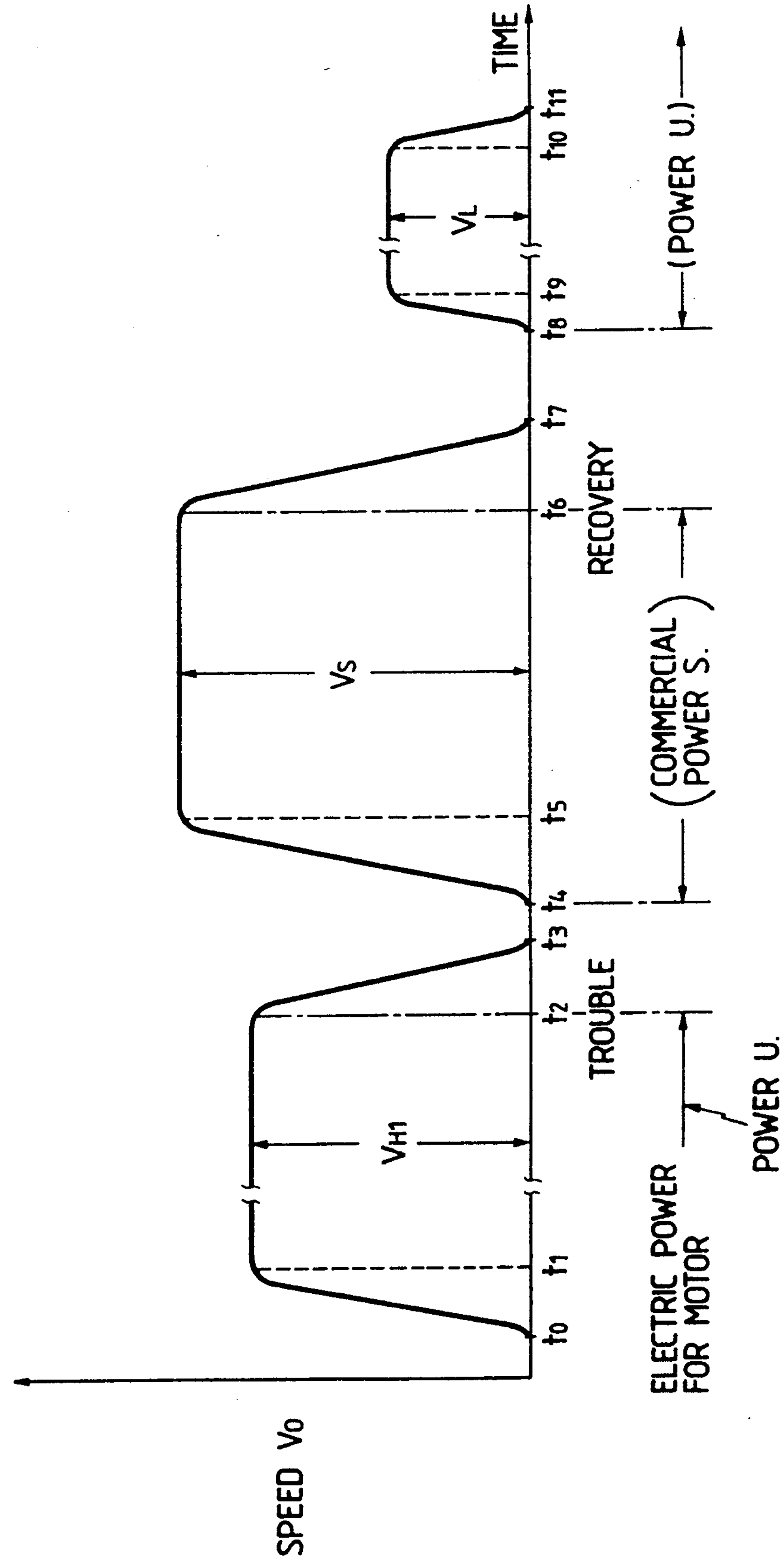
Figure 10:
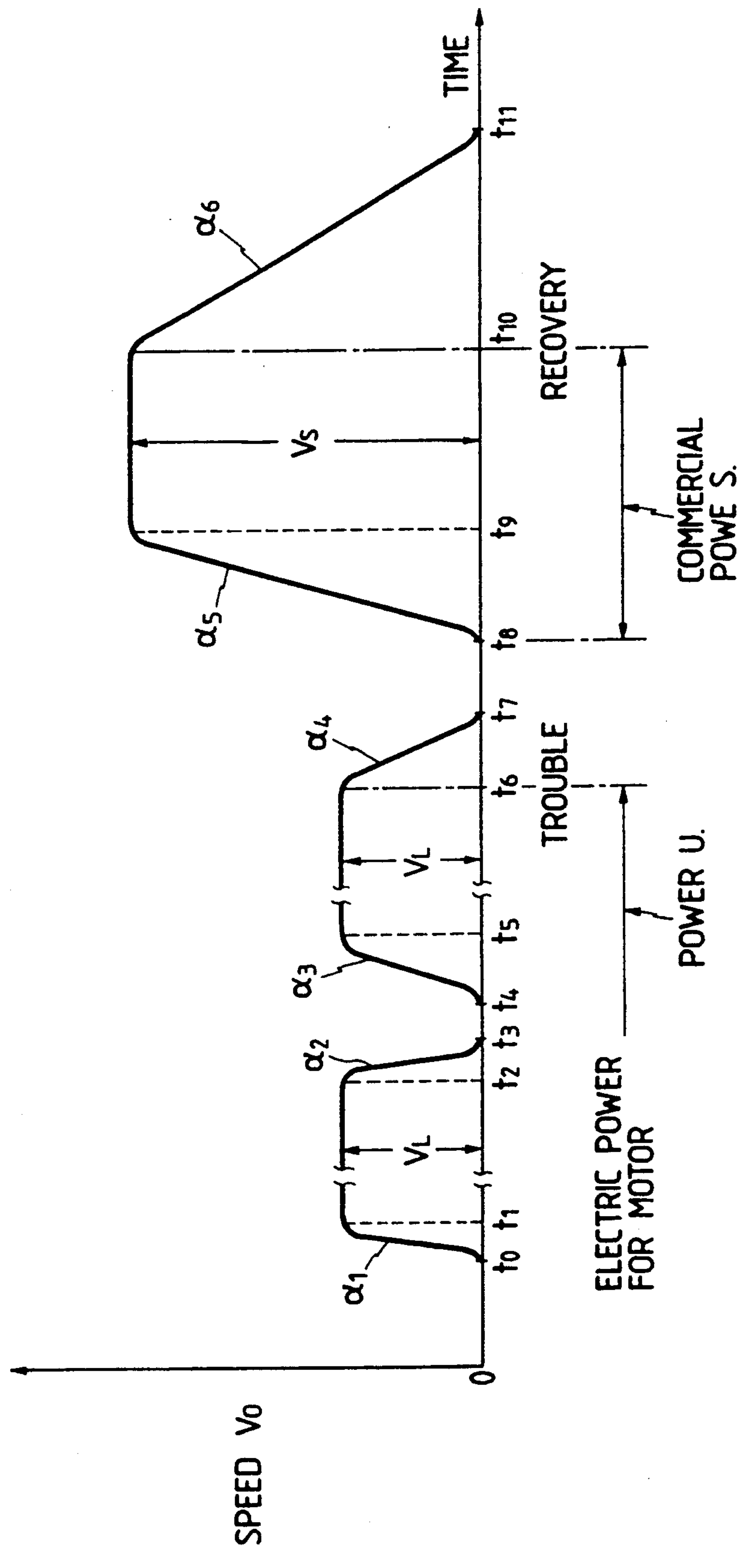

FIGS. 8 to 10 shows examples of the change of a speed command $V_O$.

In an example of FIG. 8, the changeover of the speed reference is carried at time points $t_0$ and $t_2$. It is assumed, for example, that the speed reference $V_R$ is changed by manipulating the speed setting switch 41 at time point $t_0$, whereby the speed command $V_O$ is changed from $V_L$ to $V_{H1}$ ( $V_L$). At this time, however, the acceleration setting switch 40 is not manipulated, i.e., there is no change in the acceleratirn reference $\alpha_R$. The speed command generator 42 increases the speed command $V_O$ toward $V_{H1}$ at a rate corresponding tr the predetermined acceleration, whereby the speed command $V_O$ reaches $V_{H1}$ at time point $t_1$. Further, the speed command generator 42 may include a first order lag element in order to smooth the transition of the speed command near time points $t_0$ and $t_1$. In the same manner as mentioned above, the changeover of the speed reference $V_R$ at time point $t_2$ is carried out so as to change the speed command $V_O$ from $V_{H1}$ to $V_{H2}$.

Assuming that a trouble or abnormality is detected at time point $t_4$, the power supply to the motor 2 is switched over from the power unit 10 to the commercial power source 1 as follows. At first, the contacts 32*a* are opened to separate the motor 2 from the power unit 10. Then, the contacts 31*a* are closed at time point $t_5$ to couple the motor 2 with the commercial power source 1.

The closure of the contacts 31*a* is made in anticipation of the decrease of the speed during an escalator moves by inertia. Namely, the speed of the escalator decreases after the separation of the power unit 10. When the decreasing speed becomes equal to $V_S$, which is determined by a synchronous speed of the motor 2 fed by the commercial power source 1, the contacts 31*a* are closed. To this end, the actual speed v is detected and compared with $V_S$. When v becomes $V_S$, the contacts 31*a* are closed. Instead of the detection of the actual speed v, it is also possible to close the contacts 31*a* after a predetermined time from the opening of the contacts 32*a*, i.e., time point $t_4$, which time corresponds to the delay time $t_d$ as already described.

If the trouble or abnormality is recovered at time point $t_6$, the power supply is switched over to the power unit 10. This example shows the case where the speed command is renewed at $V_{H1}$ (solid line), which is lower than $V_S$. However, it is also possible to maintain $V_{H2}$ (broken line), which is the speed command just before the occurrence of the trouble or abnormality. In the latter case, although the motor 2 has once a large slip speed, the speed of the motor 2 approaches $V_{H2}$ gradually. Further, in this case, if the speed $V_S$ when the motor 2 is fed by the commercial power source 1 is set at a given value between the maximum speed command $V_{H2}$ and the minimum one $V_L$ when the motor 2 is fed by the power unit 10, the change of the speed upon the switchover of the power supply can be made as small as possible and smoothly, whereby a shock is scarcely given to persons on the escalator. Especially, this is very convenient for old persons, children and persons using a wheelchair.

In an example shown in FIG. 9, the motor 2 is once stopped, when the power supply is switched over. Namely, when a trouble or abnormality is detected at time point $t_2$, the contacts 32*a* are opened, and the contacts 31*a* are closed at time point $t_4$, which is determined by anticipating a time required until the stop of the escalator. The contacts 31*a* can also be closed by detecting the fact that the motor 2 actually stops. Also in the recovery of the trouble or abnormality, after the contacts 31*a* are opened at time point $t_6$ and accordingly the motor 2 once stops, the contacts 32*a* are closed at time point $t_8$.

Further, in this example, the speed $V_S$ when the motor higher than the maximum speed command $V_{H1}$ when the motor 2 is fed by the power unit 10. The reason therefor is as follows. The motor 2 is required to generate the large output power as its rotating speed becomes high, and on the other hand, the energy loss in the converter 11 and the inverter 13 of the power unit 10 is in proportion to their output power. If, therefore, the motor 2 is fed by the commercial power source 1 during the high speed operation, the aforesaid energy loss is prevented from occurring, whereby the energy saving is attained.

FIG. 10 shows an example, in which the acceleration or deceleration at the time of the switchover of the speed command $V_O$ is varied. This acceleration or deceleration can be altered by manipulating the acceleration setting switch 41. By way of example, the small acceleration or deceleration will be set in the case of escalators very often used by old or handicapped persons, but the larger acceleration or deceleration will be set in the case of escalators for office buildings. Rexaining operation in this example is almost the same as other examples already described, and therefore the further explanation will be omitted.

When the power supply is switched over to consequently change the speed of an escalator, or when an escalator is stopped in order to switch over the power supply, a control apparatus is much improved in the point of view of the safety for persons using the escalator, if it is informed to them that the speed of the escalator changes or the escalator stops. By way of example, such information can be given users by actuating a buzzer or a bell in response to the signal FS of the trouble detector 45. The information can also be given by a vocal message, such as "Attention, please. Speed changes" or "Attention, please. Escalator stop temporarily". The same message can be displayed on a guidance panel. Further, the occurrence of the speed change can be informed by changing or flickering the lighting of an entrance or an exit of an escalator, treadboards or handrails.

Figure 11:
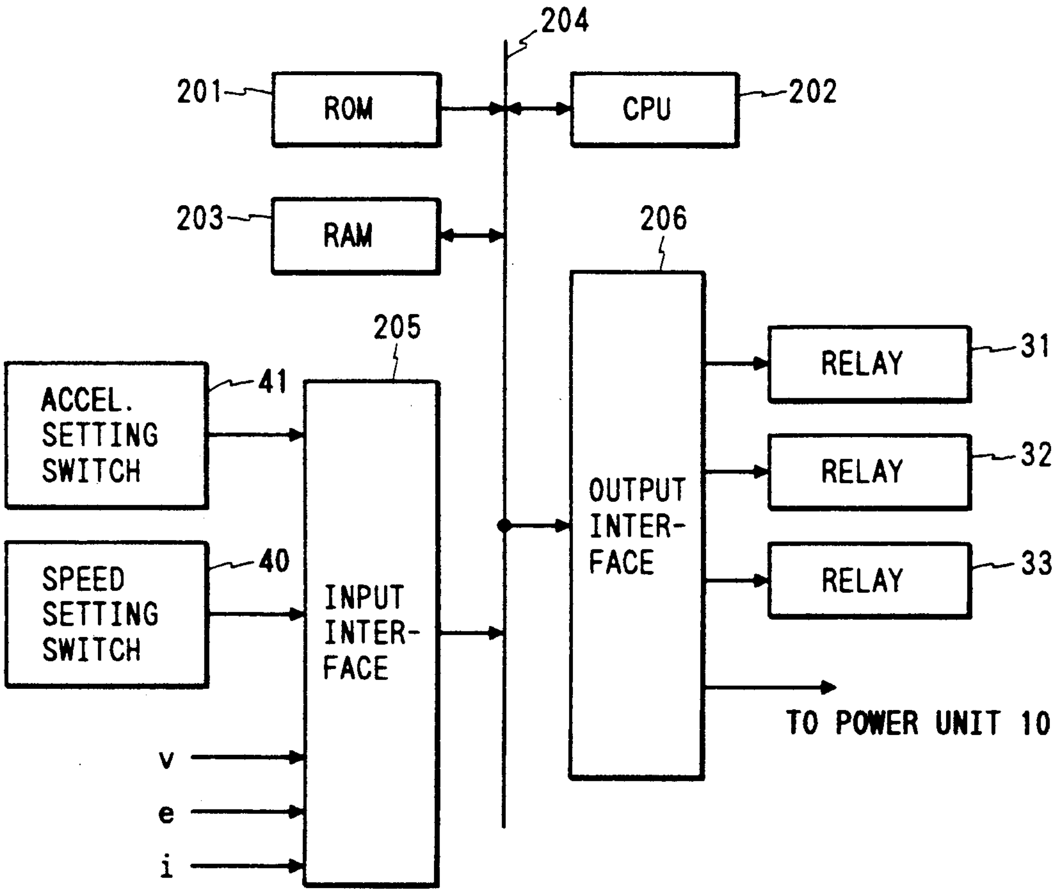
FIG. 11 is a block diagram showing another embodiment of the present invention, in which a control apparatus according to the present invention is formed by a microcomputer.

The foregoing has been described on the basis of such embodiments constructed in the form of discrete hard ware, as shown in FIG. 1. However, the present invention can be embodied by a microcomputer which is programmed so as to achieve the various functions as mentioned above. FIG. 11 shows the configuration of such an embodiment. In the figure, read-only memory (ROM) 201 stores various programs to be executed by central processing unit (CPU) 202 and various constants necessary for the execution of the programs. Random access memory (RAM) 203 stores various variables necessary for the control of an escalator and intermediate and final results of the processing operation in the CPU 202. The ROM 201, the CPU 202 and the RAM 203 are coupled with each other by bus 204. The arrangement of a microcomputer as mentioned above is the same as that usually used in this field.

To the bus 204 are coupled input interface 205 and output interface 206, through which necessary input signals are supplied to the microcomputer and processed output signals are derived therefrom. In this case, therefore, the speed setting switch 40 and the acceleration setting switch 41 are coupled to the input interface 205. Further, the signals of the speed v, the voltage e and the current i are also supplied to the microcomputer through the interface 205, for the purpose of the detection of a trouble or abnormality. The relays 31, 32 and 33 are coupled to the output interface 206. Further, the control signal for the power unit 10 is also derived from the output interface 206.

Figure 4:
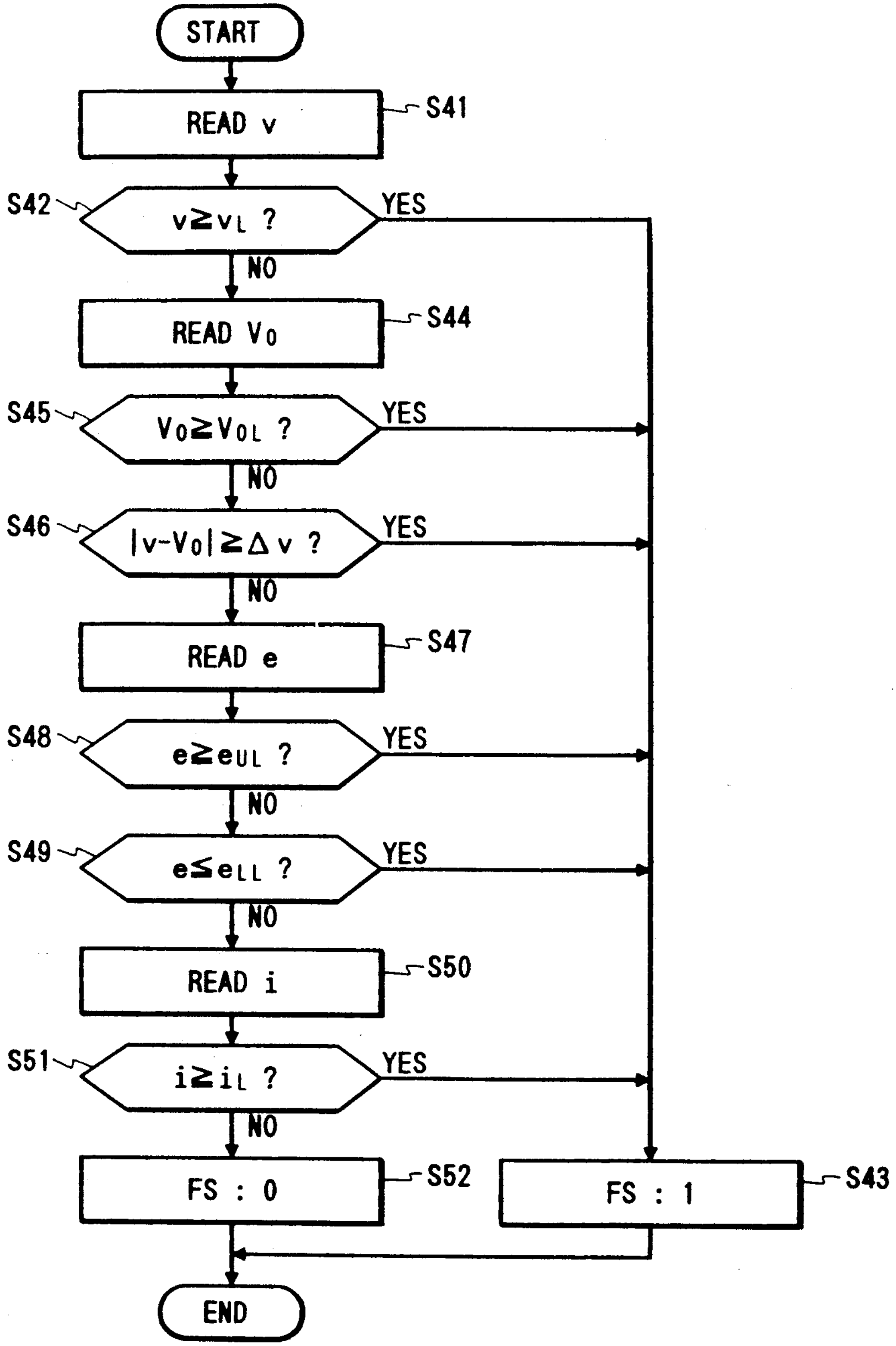
FIG. 4 is a flow chart of the processing to be executed by a microcomputer to achieve the function of a trouble detector used in the embodiment of FIG. 1.

The processing operation to be executed by the CPU 202, i.e., the programs stored in the ROM 201, can be easily determined by one ordinary skilled in this field in accordance with the flow charts as shown in FIGS. 3, 4 and 6 as well as the related explanation.

As described above, with a control apparatus for a people mover system, such as an escalator, a moving sidewalk and so on, according to the present invention, even if a trouble or abnormality occurs in a power unit or a control unit therefor, persons on the people mover system can be carried to a safe place (e.g. a departing or a next floor in the case of an escalator). Accordingly, a control apparatus for a people mover system with a high safety and a good service can be realized.

We claim:

1. A control apparatus for a people mover system comprising plural treadboards, continuously coupled in an endless form, which convey persons thereon:

a driving unit including an AC motor for driving the coupled treadboards at a controlled moving speed;

a commercial power source for selectively supplying AC source power to the motor;

a power unit.for producing AC output power controlled in response to a control signal and selectively supplying the AC output power to the motor to make the treadboards move at the controlled moving speed; and a control unit, including a microcomputer, which generates the control signal for said power unit and controls the selective power supply to the motor by said commercial power source and said power unit, characterized in that said control unit is further provided with:

a trouble detector, responsive to a predetermined signal from at least one of said driving unit, said power unit and said control unit, for detecting the occurrence of a trouble or abnormality in the people mover system; and a power switchover device for switching over the power supply to the motor from said power unit to said commercial power source in response to the trouble detection by said trouble detector

2. A control apparatus according to claim 1, wherein said power unit comprises a converter for converting the AC source power to DC power of constant voltage, a capacitor coupled across output terminals of the converter, and an inverter, coupled in parallel with the capacitor, for inverting the converted DC power into the AC output power, wherein at least either one of the voltage and the frequency of the AC output power is controlled in response to the control signal.

3. A control apparatus according to claim 1, wherein said power unit comprises a converter for converting the AC source power to DC power of constant current, a reactor coupled to one of output terminals of the converter, and an inverter, coupled in parallel with the converter through the reactor, for inverting the converted DC power into the AC output power, wherein at least either one of the voltage and the frequency of the AC output power is controlled in response to the control signal.

4. A control apparatus according to one of claims 1 to 3, wherein said trouble detector receives at least one selected from among signals corresponding to an input and output current and voltage of said power unit, an input and output current and voltage of converter and the inverter and a moving speed of said driving unit as the predetermined signal, and compares the received signal with a reference prepared therefor to detect the occurrence of the trouble or abnormality.

5. A control apparatus according to one of claims 1 to 3, wherein the microcomputer of said control unit is provided with a watch dog timer, and said trouble detector receives an output of the watch dog timer as the predetermined signal to detect the occurrence of the trouble or abnormality.

6. A control apparatus according to one of claims 1 to 3, wherein said control unit is composed of the dual microcomputer system, and the occurrence of the trouble or abnormality is detected, when two results of the processing in the dual system differ from each other.

7. A control apparatus according to one of claims 1 to 3, wherein said trouble detector receives the control signal for said power unit and detects the occurrence of the trouble or abnormality, when the control signal continues to be in the same state beyond a predetermined time.

8. A control apparatus according to one of claims 1 to 3, wherein said trouble detector detects the recovery of the trouble or abnormality, and said power switchover device switches over the power supply to the motor from said commercial power source to said power unit in response to the detection of the recovery by said trouble detector.

9. A control apparatus according to one of claims 1 to 3, wherein said power switchover device switches over the power supply to the motor from said power unit to said commercial power source, when the trouble or abnormality continues beyond a predetermined period.

10. A control apparatus according to one of claims 1 to 3, wherein said power switchover device has means for preventing the switchover of the power supply to the motor from said power unit to said commercial power source, when the trouble or abnormality occurs only within a predetermined period 11. A control apparatus according to one of claims 1 to 3, wherein the moving speed of the treadboards when the motor is fed by said commercial power source is set between the maximum and the minimum speeds which are set for the power supply to the motor by said power unit.

12. A control apparatus according to one of claims 1 to 3, wherein the switchover of the power supply to the motor is carried out, after the treadboards are stopped.

13. A control apparatus according to one of claims 1 to 3, wherein the switchover of the power supply to the motor is carried out, while the treadboards move.

14. A control apparatus according to one of claims 1 to 3, wherein there is provided means for guiding to users that a moving speed of the treadboards changes, when the moving speed is to be changed.

15. A control apparatus according to one of claims 1 to 3, wherein there is provided means for guiding to users that a moving speed of the treadboards changes, when the power supply is switched over.

16. A control apparatus according to one of claims 1 to 3, wherein there is provided means for setting an acceleration or a deceleration for changing the moving speed of the treadboards.

* * * * *